United States Patent
Gouwens (10) Patent No.: US 9,360,355 B2
(45) Date of Patent: Jun. 7, 2016

(54) ELECTROMAGNETIC FLOW METER

(75) Inventor: Lee Gouwens, Des Plaines, IL (US)

(73) Assignee: CMI Novacast Inc., Des Plaines, IL (US)

( * ) Notice: Subject to any disclaimer, the term of this patent is extended or adjusted under 35 U.S.C. 154(b) by 347 days.

(21) Appl. No.: 13/814,007

(22) PCT Filed: Aug. 3, 2011

(86) PCT No.: PCT/US2011/046510
§ 371 (c)(1),
(2), (4) Date: Feb. 4, 2013

(87) PCT Pub. No.: WO2012/018962
PCT Pub. Date: Feb. 9, 2012

(65) Prior Publication Data
US 2013/0139608 A1   Jun. 6, 2013

Related U.S. Application Data

(60) Provisional application No. 61/370,407, filed on Aug. 3, 2010.

(51) Int. Cl.
*G01F 1/56* (2006.01)
*G01F 1/58* (2006.01)

(52) U.S. Cl.
CPC . *G01F 1/56* (2013.01); *G01F 1/586* (2013.01)

(58) Field of Classification Search
CPC .............. G01F 1/56; G01F 1/58; G01F 1/60; G01F 1/586; G01F 1/588; G01F 1/582
USPC .......... 73/861.11, 861.09, 576, 578, 722, 735
See application file for complete search history.

(56) References Cited

U.S. PATENT DOCUMENTS

| | | | | |
|---|---|---|---|---|
| 3,428,840 A | * | 2/1969 | Kober | H02K 9/22 310/114 |
| 3,543,066 A | * | 11/1970 | French | H02K 5/132 310/186 |
| 3,824,456 A | * | 7/1974 | Wiegand | G01R 33/04 324/204 |
| 3,847,020 A | * | 11/1974 | Jurschak | G01F 1/20 73/861.71 |
| 4,346,604 A | | 8/1982 | Snook et al. | |
| 4,392,786 A | * | 7/1983 | Merenkov | H02K 44/06 417/50 |
| 4,738,144 A | | 4/1988 | Cage | |
| 4,745,811 A | * | 5/1988 | Gray | G01L 9/14 338/32 H |

(Continued)

FOREIGN PATENT DOCUMENTS

| | | |
|---|---|---|
| CN | 1957519 | 5/2007 |
| JP | 56-117316 | 9/1981 |

OTHER PUBLICATIONS

International Search Report for PCT Application PCT/US2011/46510, dated Dec. 13, 2011.

*Primary Examiner* — Eric S McCall
*Assistant Examiner* — Mohammed E Keramet-Amircola
(74) *Attorney, Agent, or Firm* — Faier & Faier P.C.; James M. Faier; Martin M. Faier (57) ABSTRACT

A flow meter comprising a magnet, a substantially non-magnetic conduit adapted to convey conductive fluid flowing in said conduit, said conduit arranged proximate to said magnet, and a sensor for sensing distortion of lines of force created by said magnet when said fluid flows in said conduit. Neither the magnet nor the sensor need be in physical contact with the conduit that carries the conductive fluid.

20 Claims, 13 Drawing Sheets

(56) References Cited

U.S. PATENT DOCUMENTS

| | | | | |
|---|---|---|---|---|
| 4,944,190 | A * | 7/1990 | Scally | G01F 1/24 73/861.56 |
| 5,228,469 | A * | 7/1993 | Otten | A01G 25/16 137/466 |
| 5,325,869 | A * | 7/1994 | Stokes | A43B 1/0054 600/592 |
| 5,544,532 | A | 8/1996 | Brown | |
| 5,551,306 | A | 9/1996 | Scarpa | |
| 5,578,763 | A | 11/1996 | Spencer et al. | |
| 5,661,232 | A * | 8/1997 | Van Cleve | G01F 1/8459 73/32 R |
| 5,877,429 | A * | 3/1999 | Gauley | G01F 1/115 73/861.77 |
| 5,977,523 | A | 11/1999 | Scott | |
| 6,085,599 | A | 7/2000 | Feller | |
| 6,092,429 | A * | 7/2000 | Cunningham | G01F 1/8413 73/861.356 |
| 6,178,956 | B1 | 1/2001 | Steinmann et al. | |
| 6,466,004 | B1 | 10/2002 | Rogers et al. | |
| 6,505,517 | B1 | 1/2003 | Eryurek et al. | |
| 6,611,770 | B1 | 8/2003 | O'Donnell et al. | |
| 6,626,048 | B1 | 9/2003 | Dam Es et al. | |
| 6,865,956 | B2 | 3/2005 | Yamamoto | |
| 7,124,645 | B2 | 10/2006 | Huybrechts et al. | |
| 7,343,817 | B2 | 3/2008 | Wehrs et al. | |
| 7,421,908 | B2 | 9/2008 | Jarrell et al. | |
| 7,503,227 | B2 | 3/2009 | Davis et al. | |
| 7,509,852 | B2 | 3/2009 | Maute | |
| 7,574,924 | B1 | 8/2009 | Feller | |
| 7,654,318 | B2 | 2/2010 | Cooper et al. | |
| 2002/0170362 | A1 * | 11/2002 | Nimberger | A01C 23/007 73/861 |
| 2002/0189337 | A1 | 12/2002 | Maute | |
| 2002/0190444 | A1 | 12/2002 | Kagan | |
| 2003/0074984 | A1 | 4/2003 | Peterson | |
| 2004/0140800 | A1 | 7/2004 | Madio et al. | |
| 2005/0109120 | A1 | 5/2005 | Turner | |
| 2005/0126305 | A1 | 6/2005 | Schultz et al. | |
| 2005/0258786 | A1 | 11/2005 | Kellogg et al. | |
| 2006/0237438 | A1 | 10/2006 | Wilkins et al. | |
| 2008/0084201 | A1 | 4/2008 | Kojori | |
| 2008/0296208 | A1 | 12/2008 | Ikeyama et al. | |
| 2009/0157001 | A1 | 6/2009 | Jones et al. | |
| 2010/0126601 | A1 * | 5/2010 | Heron | G05D 16/163 137/488 |
| 2010/0168927 | A1 * | 7/2010 | Burrows | E03B 1/00 700/282 |
| 2011/0083514 | A1 * | 4/2011 | Naier | G01F 1/115 73/861.11 |

\* cited by examiner

Upper and Lower Magnet and
Sensor Assembly Details

ELECTROMAGNETIC FLOW METER

CLAIM OF PRIORITY

This application claims benefit of PCT/US2011/046510 filed on 3 Aug. 2011 with the United States Patent and Trademark Office as receiving office for the International Bureau which is fully incorporated by reference. PCT case PCT/US2011/046510 claimed priority from U.S. Patent and Trademark Office Provisional Patent Application Ser. No. 61/370,407 titled "Electromagnetic Flow Meter" filed 3 Aug. 2010 which is fully incorporated by reference.

FIELD OF THE INVENTION

The present invention is drawn to flow meters, and, more specifically, an electromagnetic flow meter capable of measuring the flow of high temperature, corrosive, conductive fluids flowing in a conduit such as a pipe or trough.

BACKGROUND OF THE INVENTION

Measuring the rate of flow of material in a conduit is an essential activity in many an industrial process. The invention disclosed herein is a result of work in world of metal castings. In that world companies cast parts using molten Magnesium, Aluminum, other metals, and alloys of metals. The companies have long sought a reliable flow meter so that they knew how much material and at what rate they were filling a mold. The axiom is true that if one cannot measure something, then he cannot manage it. The measurement allows someone to close the quality control loop, for instance, by experimenting with different fill rates and seeing which results in a better casting. Such management is impossible unless the manager can measure the rate of flow of material in a system.

In the case of molten metals that are highly corrosive or at high temperature, there has been no good flow meter. Previously, persons interested in measuring the flow of a molten metal in a pipe would have used either a linear annular induction flow meter or an electromagnetic flow meter where the electrodes needed to be in contact with the moving material. Such electrodes would need to be insulated from the conduit or pipe which presented problems for material selection and manufacturability while the electrodes themselves needed to be able to withstand and survive long-term contact with the flowing material. What has been needed is a flow meter that did not require physical contact between the measuring device and the material being measured. The present invention addresses those needs.

There are other flow meters. Some flow meters use an impeller and count the speed or revolutions of the impeller but such a system would not function where a metal melted or fouled the impeller. There are also sonar based systems but such systems will not work on materials that would corrode transducers. There are Doppler flow meters but such meters will not work unless there are impurities present in the flow.

An electromagnetic flow meter operates on the premise of Faraday's Law. For an electromagnetic flow meter one needs a conductive fluid and something that emits magnetic force. The magnetic force compels charged particles in the flow to separate into positively-charged particles and negatively-charged particles. The flowing of conductive fluid in a conduit through a magnetic field will induce a current of electricity. The induced voltage $\epsilon$ generated in the magnetic field B due to a conductive liquid moving at velocity v is thus given by:

$$\epsilon = Blv.$$

where l is the distance between electrodes in the magnetic flow meter.

In a typical electromagnetic flow meter, a conduit is fitted with field coils on either side of a measuring tube. Two electrodes are fitted in the tube at right angles to the field coils. A non-polar insulating sleeve is often fitted in the tube to avoid the communication of charge to the metallic tube in which the fluid is conveyed. The field coils apply a magnetic force across the measuring tube perpendicular to the direction of flow. At rest, the positively-charged and negatively-charged particles in the conductive fluid are evenly distributed throughout the fluid. When the fluid starts to move through the measuring tube, then positively-charged and negatively-charged particles are separated out and tend toward one of the electrodes. An electrical voltage forms which is detected and measured by the two electrodes. That voltage is directly proportional to the velocity, and, together with the known measuring tube diameter, the rate of flow can be calculated. In order to eliminate interference voltage, the polarity of the field coils alternate at regular intervals. In some instances the data collected is otherwise treated to remover noise in the signal. There are many problems with the traditional electromagnetic flow meter including the cost of field coils, equipment to alternate the coils, exciters sometimes employed, equipment used to cleanse the "noise" from data collected. There is also the reliability problem associated with the increase in probability that something will break because of pieces employed. One can find aspects of this approach to flow measurement in numbers of patents issued.

The inventor is aware of the following patents and publications in the flow meter arts:

1. U.S. Pat. Nos. 6,505,517, 7,343,817, 6,505,517, 5,544,532, 6,611,770, 7,503,227, 5,578,763, 5,551,306, 6,865,956, 7,421,908, 7,509,852, 7,654,318, 7,124,645, and,

2. Patent Publications 2002/0189337, 2008/0296208, 2005/0109120, 2002/0190444.

SUMMARY OF THE INVENTION

At the heart of this disclosed invention is the observation that measuring the induced current is unnecessary since one can deduce the rate of flow of a conductive fluid by observing the distortion of magnetic lines of force caused by the current induced by that conductive fluid. Since inventor is not measuring the induced current but rather the effect of that current, inventor does not need electrodes in direct physical contact with the conductive fluid. This invention operates by measuring the amount of distortion in a magnetic field that is caused by movement of a conductor within that magnetic field. The effect is similar to what is called "armature reaction" in certain electric motors and generators. Instead, inventor needs to have an emitter of magnetic lines of force and a sensor capable of measuring the distortions of those magnetic lines of force. Then the inventor sandwiches the sensor between the conduit that is adapted to carry the conductive fluid and the emitter of magnetic lines of force. Where the conductive fluid is flowing in the conduit, the flow induces a current, the current distorts the magnetic lines of force and the sensor reads that distortion. Accuracy of the readings come from keeping the sensors as close to the conductive fluid as possible and providing sufficient magnetic force so that the sensors can identify the magnetic force of the magnets from other sources of magnetic force in the operating environment. The meter sits on the outside of the pipe. The material passing through the pipe can have any level of corrosiveness, and it will not affect the flow meter.

In the preferred embodiment, the inventor uses a conduit (such as a pipe) six inches or less in diameter, two rare earth magnets (one on either side of the conduit), and a circuit board fitted with two Hall-Effect sensors. The circuit board with sensors is installed close to the conduit such that the sensors are not destroyed by heat. The circuit board is installed with sensors parallel to the axis of the conduit. Sensor temperature can be kept within operating tolerances by installing a combination of heat sink and/or cooling fan, and packing the sensors in micro porous insulation. The conduit is typically a pipe. The pipe is typically made of a substantially non-magnetic material suitable for the conductive fluid to be placed in the pipe. Unless temperature of the conductive fluid is an issue, a 300-series stainless steel pipe would be used. In the instance where the conductive fluid is molten Aluminum, the pipe needs to be composed of a ceramic to withstand the temperature and corrosive nature of molten Aluminum. In the instance where the fluid is to be pumped at high pressure (such as 700 p.s.i.), the pipe should be composed of Tantalum. In the preferred embodiment, the conduit is six inches or less in diameter because inventor found that over that diameter that the magnet on the far side of the conduit contributed little to the quality of the distortions observed by the Hall-Effect sensors. The inventor uses a linear Hall-Effect sensor. The inventor chose to have two Hall-Effect sensors to improve the accuracy of his observations. In the preferred embodiment, data from the fore and aft Hall-Effect sensors on the circuit board allow the inventor to better calculate the distortions caused the any induced current. When set in place, the bar magnets are adjusted along the axis of the conduit relative to the Hall-Effect sensors and the conduit so that the difference in the observed distortion by the fore and aft sensors when the conductive fluid is at rest is zero. Otherwise said, Inventor seeks to position the magnets so that (distortion observed by Hall Sensor α)−(distortion observed by Hall sensor β)=0. Inventor typically needs to shift a magnet less than ⅛th inch forward or backward to achieve the zero position. Here is an illustration:

where "n" is north pole of bar magnet and "s" is south pole of bar magnet. The magnet could equally well be placed with the north pole down and the south pole up. If one is using a two-magnet system with one magnet above the conduit and one magnet below the conduit, then the poles need to align so that if the north pole of one magnet is toward the conduit then the south pole of the other magnet is toward the magnet or vice versa. Here is an illustration:

The Hall-Effect sensors are accurate in the range of +/−600 Gauss. In the preferred embodiment, the inventor would use two 500-Gauss bar magnets. In the preferred embodiment, the conduit is straight and diameter reduced so that there is a flat area where the sensors are placed so as to further reduce the distance between the two bar magnets. Where the fluid in the conduit is at high pressure, the conduit is not flattened out at the point of measurement because the pressure of the fluid caused the conduit to bow out so as to undermine the flattening scheme. In the case of molten Aluminum, the conduit would be ceramic and the conduit would not be flattened due to difficulty of molding the flattened conduit. In the preferred embodiment, the structure of the flow meter, excepting the conduit would have to be selected based on the conductive fluid to be in the conduit, would be made of mild steel. The meter runs with opposite polarity when the direction of flow of the fluid is reversed.

In an alternate embodiment, the shift in the magnetic field could also be measured by means of force or displacement transducers on the magnet structure with similar results.

The distortion of the magnetic field is affected by the following factors: (1) the composition of the conductive fluid in the conduit, (2) diameter of the conduit, (3) the temperature of the conductive fluid flowing in the conduit, (4) the rate of flow of the conductive fluid, (5) the electrical conductivity of the conductive fluid, and (6) the strength of the magnetic field.

The electromagnet flow meter in this invention is calibrated typically by using another type of flow meter such as a Vortex-Shedding flow meter and making observations of the type of conductive fluid, the temperature of the conductive fluid, and the distortions in the magnetic lines of force of sensed. The flow meter is then fitted with display and gauge means that relate the observed distortions with a flow rate stated by the other flow meter. In calibrating the disclosed flow meter for use with aluminum or magnesium, the process must be changed because there are not many other meters that will survive such a high temperature application. Adequate calibration should be achieved by flowing high temperature conducting fluid at a fixed rate for a fixed period of time, weighing the delivered metal, and dividing by the amount of time to get the flow per second and correlating that result with the output of the invention to arrive at a flow factor in order to generate an output signal related to and scaled to suitable engineering unit, such as liters per minute.

In the preferred embodiment, the magnetic lines of force are provided by rare earth magnets or electromagnets, although rare earth magnets are preferred as they produce the required magnetic lines of force while being more compact. The two rare earth magnets typically used are Neodymium Iron Boron ($Nd_2Fe_{14}B$) magnets and Samarium-Cobalt ($SmCo_5$ or $SmCo_{17}$) magnets. The Neodymium Iron Boron magnets are effective up to 200 degrees Celsius. The Samarium-Cobalt magnets are effective up to 350 degrees Celsius. The magnet should be chosen such that the temperature of the magnet is kept below the effective limit. If a rare earth magnet gets too hot, then it loses its magnetic qualities permanently. That temperature where a particular type of rare earth magnet loses its magnetic quality is called its "Curie Point." In the preferred embodiment, the bar magnets could be cubic or flat squares. In the preferred embodiment, the magnets are set parallel to the conduit although even round magnets would work. Coils could be used to produced the required magnetic field.

The set up of the flow meter when aluminum is the conducting fluid is no different from any other media, except more space may be required between the flowing conductive fluid and the Hall-Effect sensors so as to keep the sensors cool enough. The temperature of Aluminum can be 800 degrees Celsius. The Hall-Effect sensors should not be allowed to get hotter than 150 degrees Celsius. By using a very good thermal insulating material between the conduit carrying high temperature conductive fluid and the Hall-Effect sensors and magnets, the temperature of the Hall-Effect sensors and the magnets can be kept well within their safe operating temperature ranges. The magnets, being farther away from the conductive fluid than the Hall-Effect sensors, are exposed to lower temperatures than the Hall-Effect sensors.

The flow tube is not required to be straight, it could curve, but such a curve would reduce the sensitivity of the meter, but it could prove useful in certain applications. The flow tube does not need to be of uniform dimension. Most flow meters require a straight section of pipe upstream equal to ten pipe diameters and downstream equal to four pipe diameters so as to minimize turbulence in the flow at the measuring point. The applicability of this rule of thumb to this invention is unknown as yet but is likely doubtful since there this invention does not necessarily place a sensor in the path of the flowing material in the flow tube, conduit, or measuring tube.

Magnetic lines of force tend to concentrate at the ends of magnets, and these lines of force leave the surface of the magnet perpendicular to the surface. The lines of force emanating from a given pole of the magnet tend to repel each other since they are of the same polarity, which makes them behave somewhat like stretched rubber-bands. In the absence of other forces, the lines of force from a magnet emanate in their curved geometry symmetrically from each end of the bar magnet.

In the preferred embodiment, the conductive fluid conduit is roughly perpendicular to the magnetic lines of force. When the conductive fluid flows, an electrical current is induced in the fluid, and this induced field produces its own magnetic field that distorts the magnetic field produced by the magnets (magnetic field producing means). The Hall-Effect sensors are mounted adjacent to the ends of the bar magnet since inventor found that the natural curving of the magnetic lines of force about the ends of the magnets resulted in improved reading of distortions of those magnetic lines of force.

In the preferred embodiment, a trace heater is wrapped around the conduit so that the conduit may be pre-heated before the conductive fluid is introduced into the flow meter. The trace heater is controlled with a thermocouple. Connections for the thermocouple are on the backside of the flow meter. In the preferred embodiment, the circuit board on which the Hall-Effect sensors are mounted is also fitted with a voltage regulator that is used to receive 24 volts from any control system and reduce and supply a consistent 5-volts to the Hall-Effect sensors.

DETAILED DESCRIPTION OF THE DRAWINGS

The drawings detail the entire assembly of the electromagnetic flow meter from the exterior housing detail to an exploded schematic showing parts details.

FIGS. 1 through 4 show the exterior of the electromagnetic flow meter. An outer shield 39 covers the electromagnetic flow meter with the exception of the pipe or conduct that enters 1a the flow meter and exits the flow meter 1b. The conductive fluid would enter the electromagnetic flow meter through the pipe or conduit 1a. The conductive fluid would exit the electromagnetic flow meter though the same pipe or conduit 1b. In FIGS. 5 through 10, the outer shield 39 is removed revealing the interior of the electromagnetic flow meter.

Figure 1:
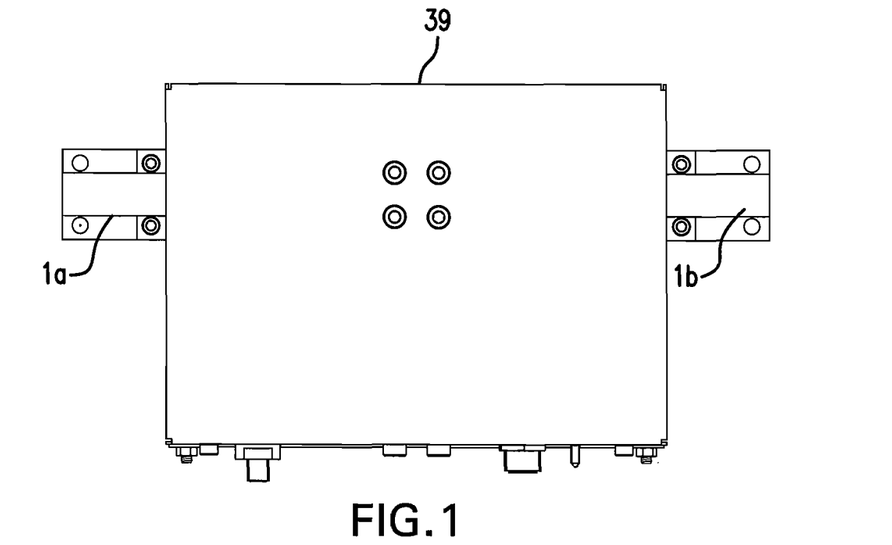
FIG. 1 is a plan view of the electromagnetic flow meter showing the metal inlet, the housing and the metal discharge.
Figure 2:
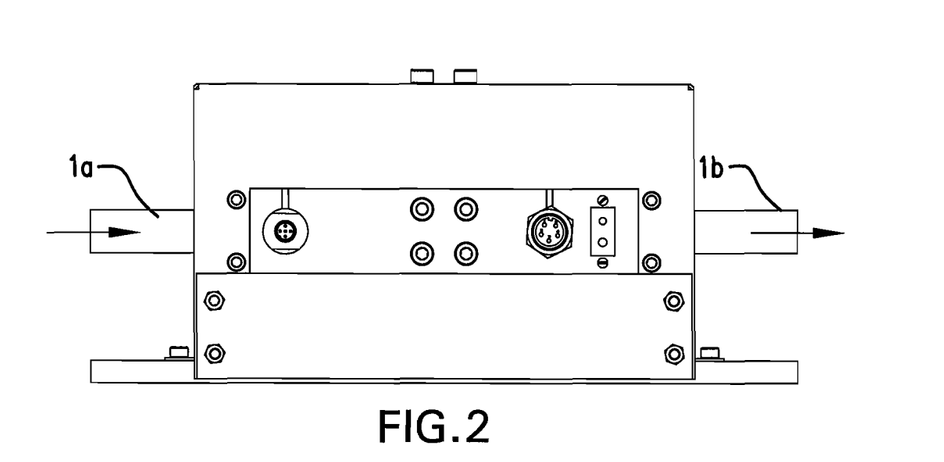
FIG. 2 is a front view of the electromagnetic flow meter with the cover.
Figure 3:
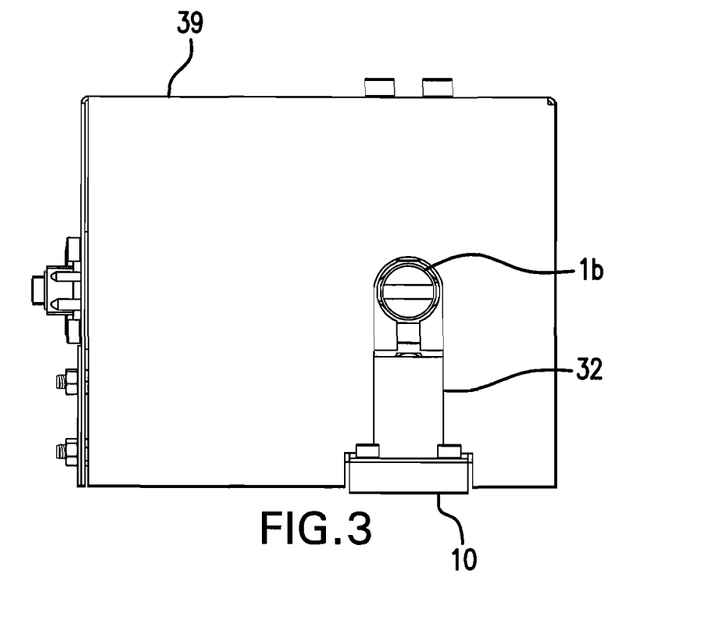
FIG. 3 is a right side view of the electromagnetic flow meter with the cover.
Figure 4:
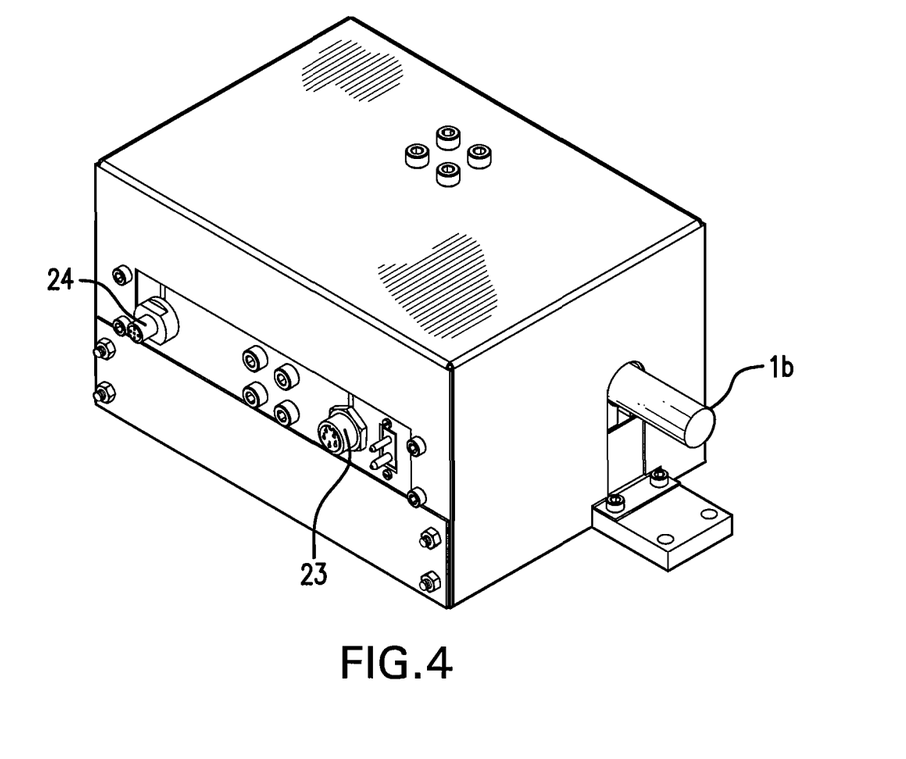
FIG. 4 is a perspective view of the electromagnetic flow meter with the cover.
Figures 5, 6:
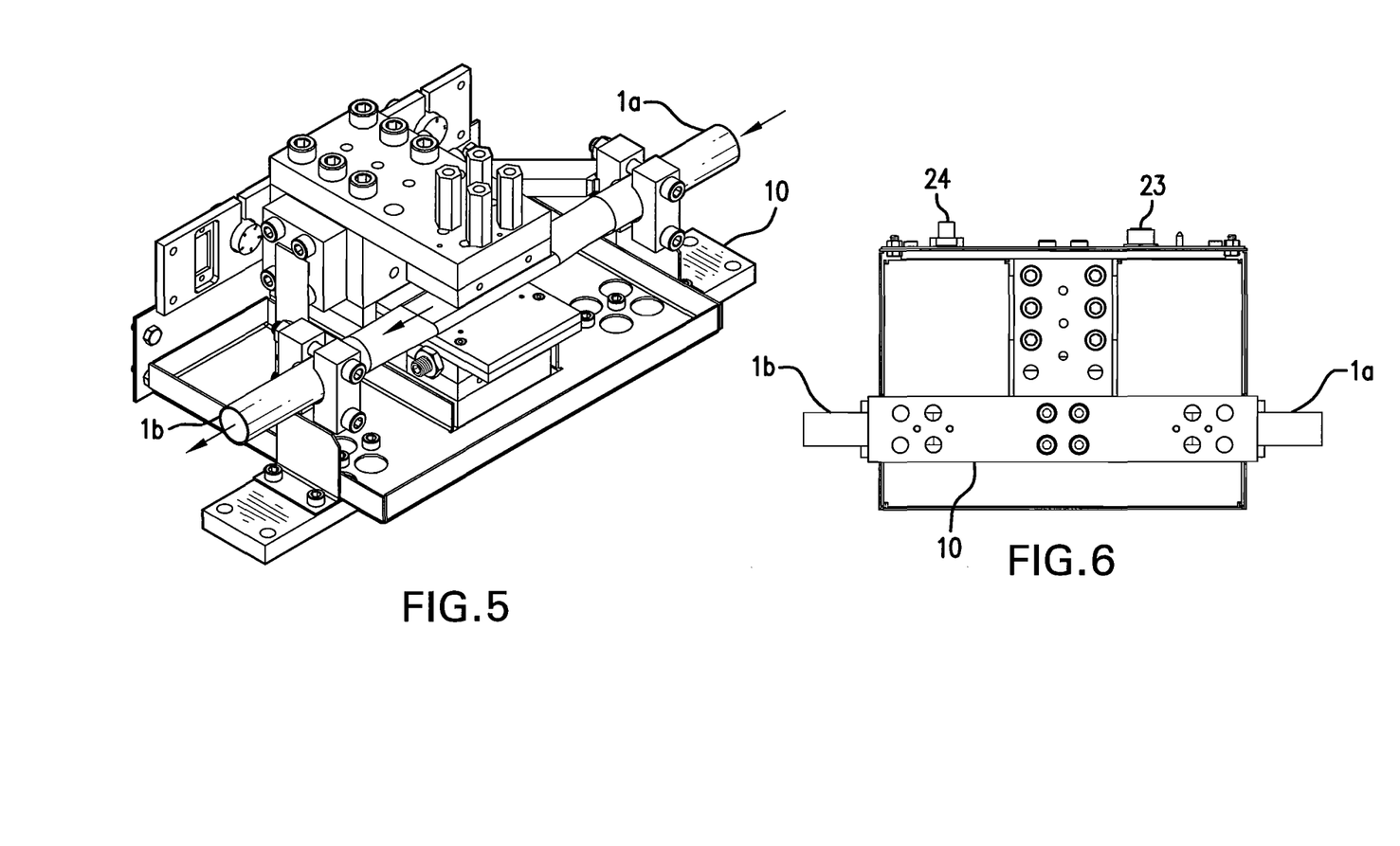
FIG. 5 is a perspective view of the electromagnetic flow meter without the cover.
FIG. 6. is a bottom view of the electromagnetic flow meter with the cover.
Figure 7:
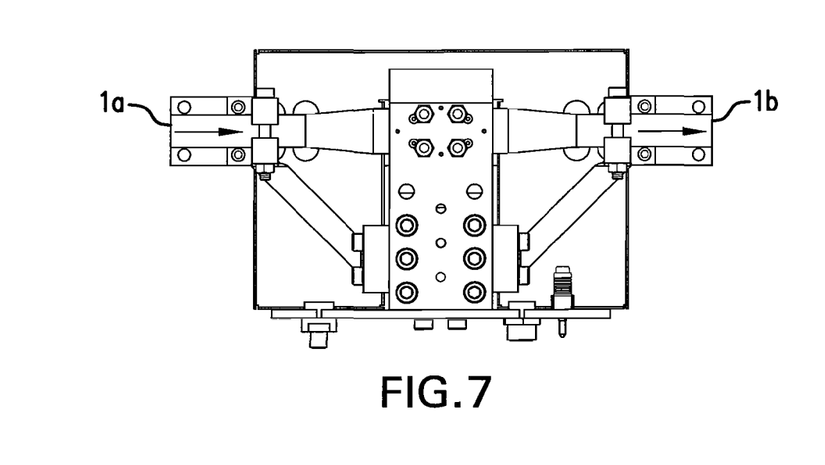
FIG. 7 is a plan view of the electromagnetic flow meter without the cover.
Figure 8:
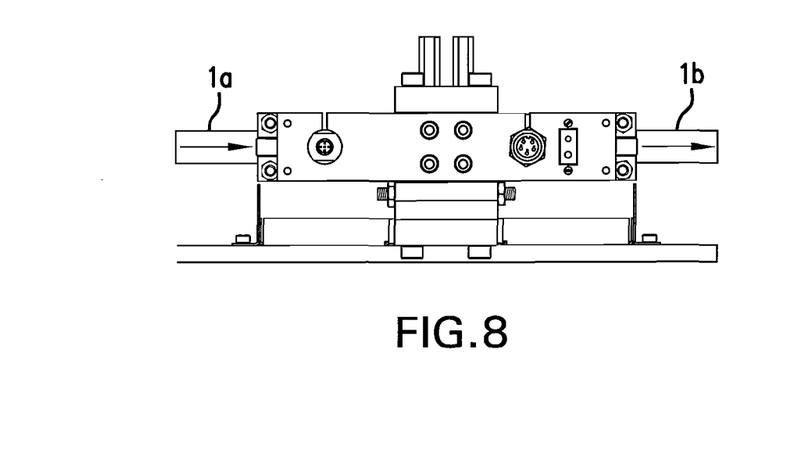
FIG. 8 is a front view of the electromagnetic flow meter without the cover.
Figure 9:
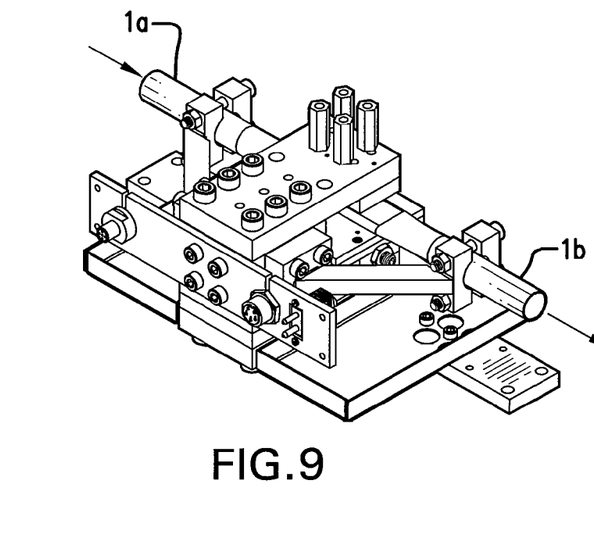
FIG. 9 is a perspective view of the electromagnetic flow meter without the cover.
Figure 10:
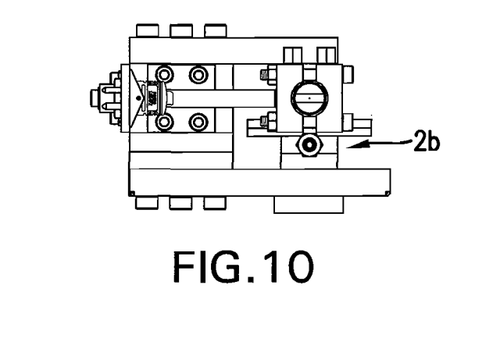
FIG. 10 is a right side view of the electromagnetic flow meter without the cover.
Figure 11:
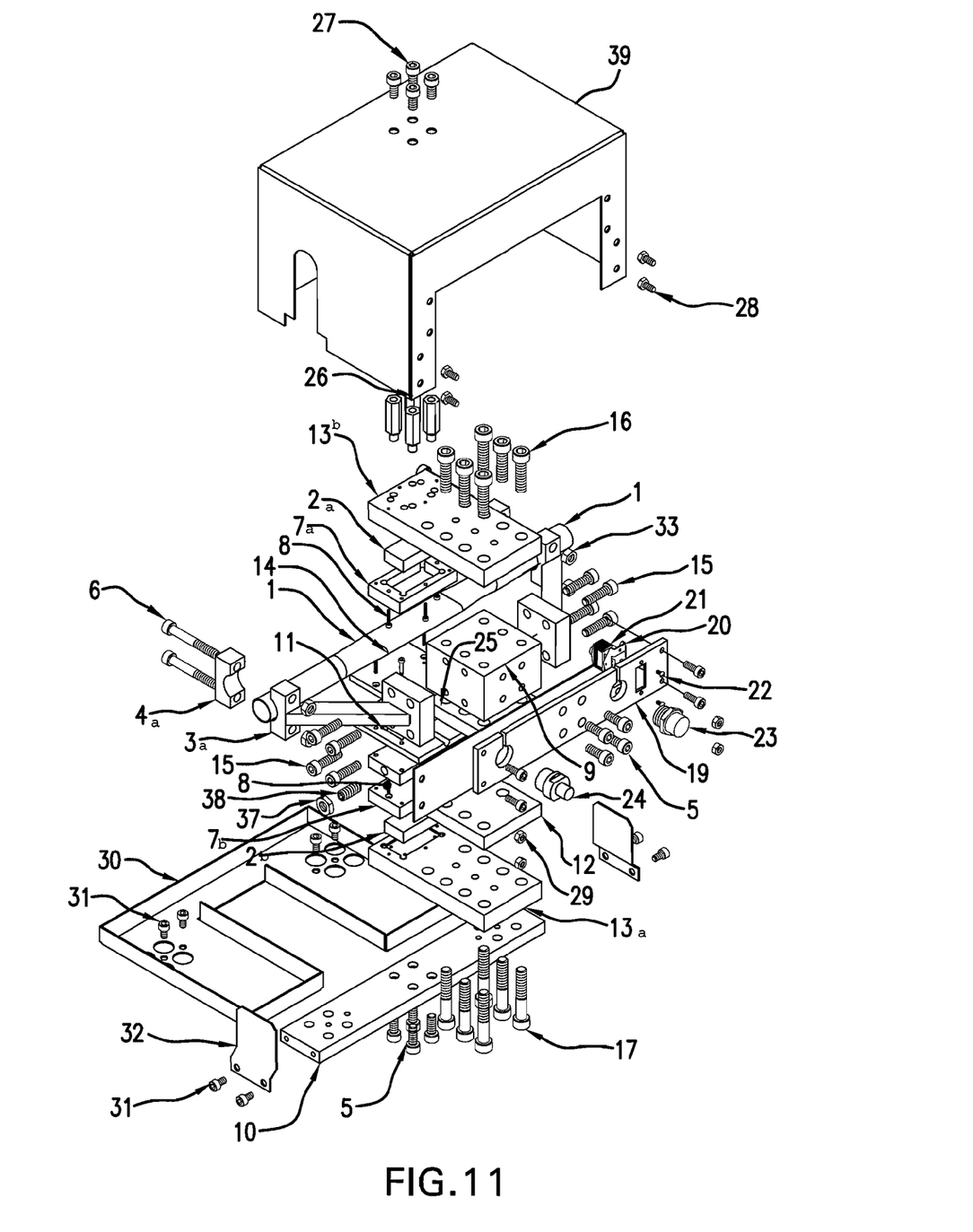
FIG. 11 is a schematic of the electromagnetic flow meter shown from the rear perspective view without a cover.
Figure 12:
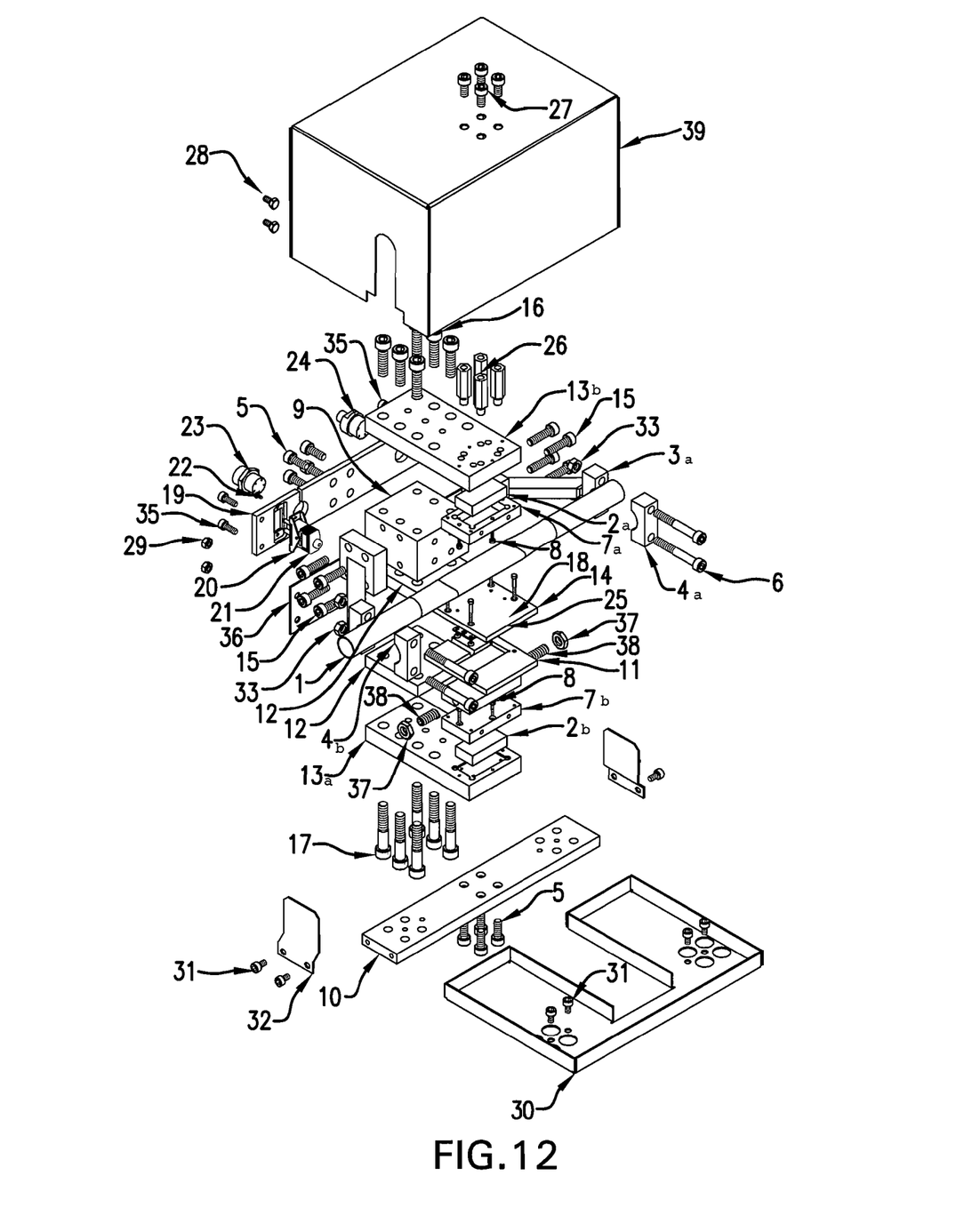
FIG. 12 is a schematic of the electromagnetic flow meter shown from the front perspective view without a cover.
Figure 12A:
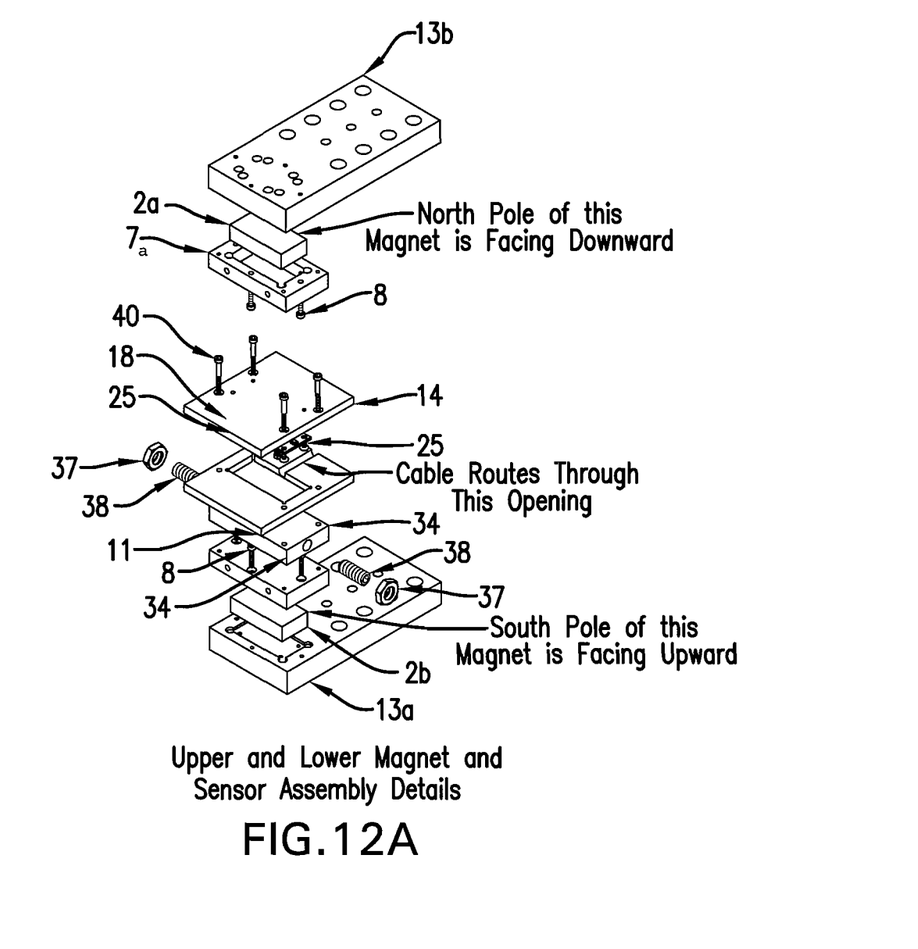
FIG. 12a shows a schematic of the upper and lower magnet assembly from the perspective view.
Figure 13:
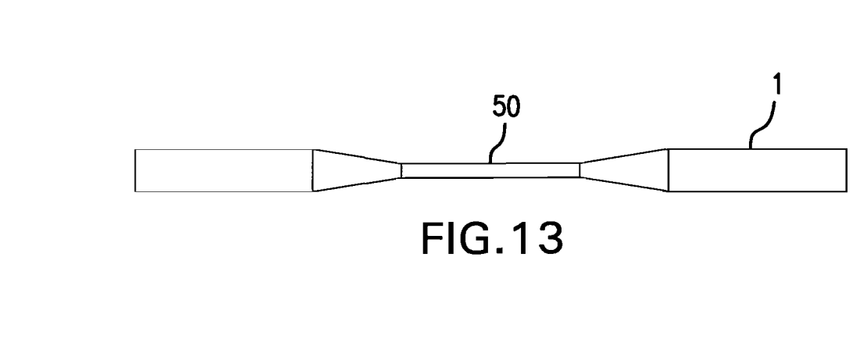
FIG. 13 is a front view of the pipe or conduit through which the material moves in the electromagnetic flow meter.
Figure 14:
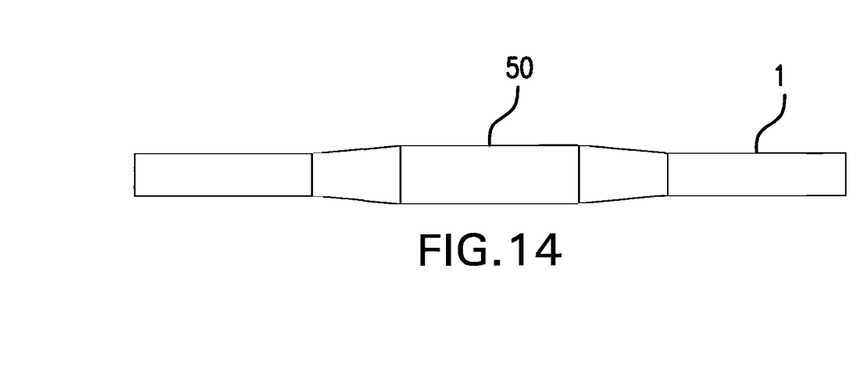
FIG. 14 is a plan view of the pipe or conduit through which the material moves in the electromagnetic flow meter.
Figure 15:
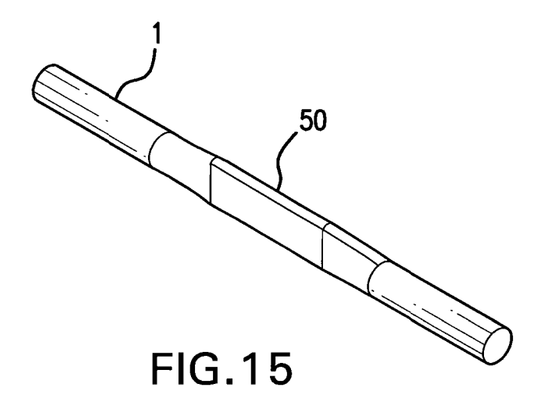
FIG. 15 is a perspective view of the pipe or conduit through which the material moves in the electromagnetic flow meter.
Figure 16:
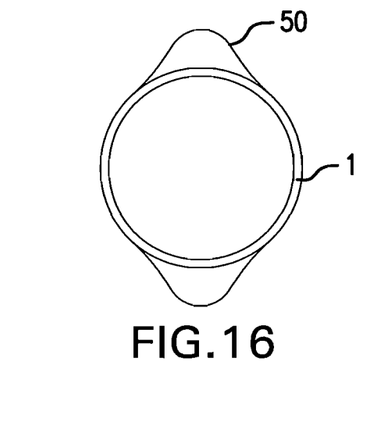
FIG. 16 is an end view of the pipe or conduit through which the material moves in the electromagnetic flow meter.
Figure 17:
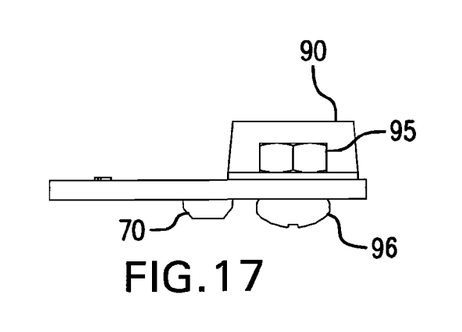
FIG. 17 is the end view of the hall-effect sensor circuit board.
Figure 18:
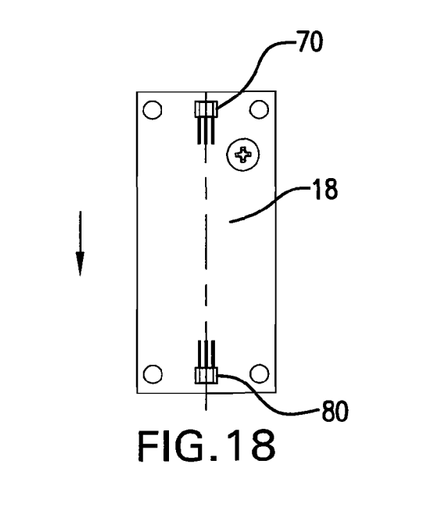
FIG. 18 is a top view of the hall-effect sensor circuit board.
Figure 19:
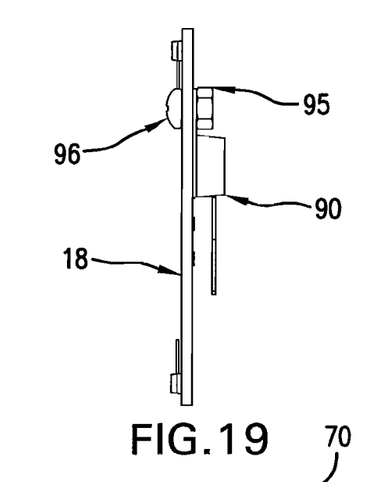
FIG. 19 is a side view of the hall-effect sensor circuit board.
Figure 20:
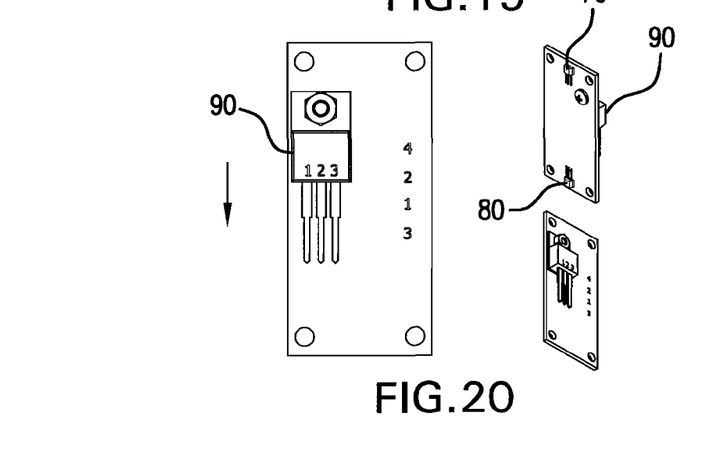
FIG. 20 is a bottom view of the hall-effect sensor circuit board.
Figure 21:
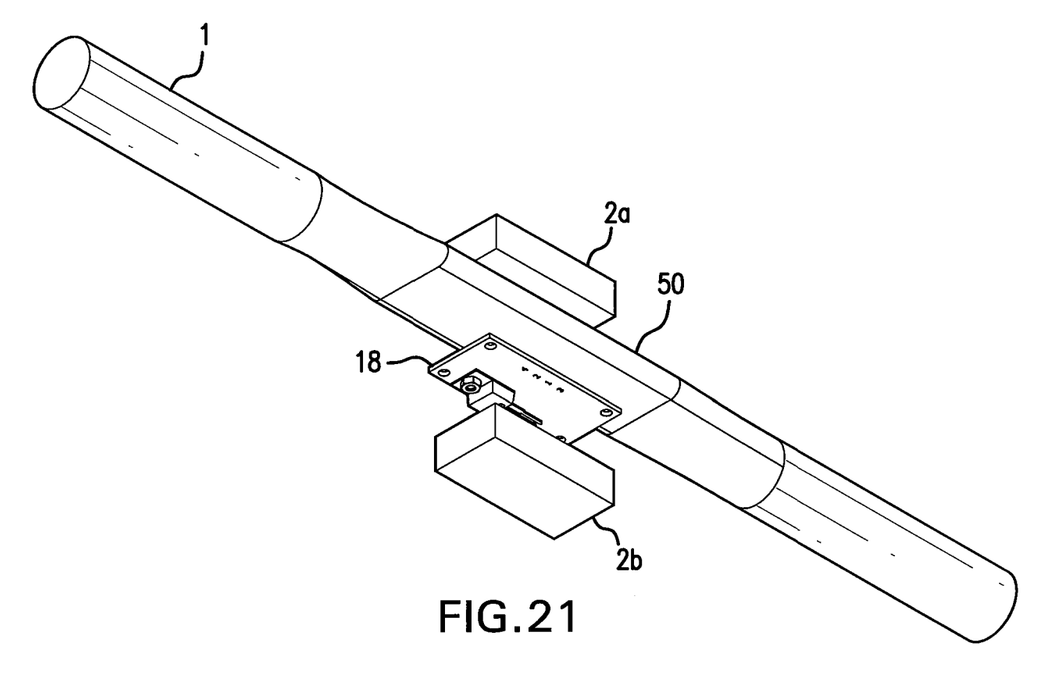
FIG. 21 is an isometric view of the conduit, magnets, and hall-effect sensor circuit board.
Figure 22:
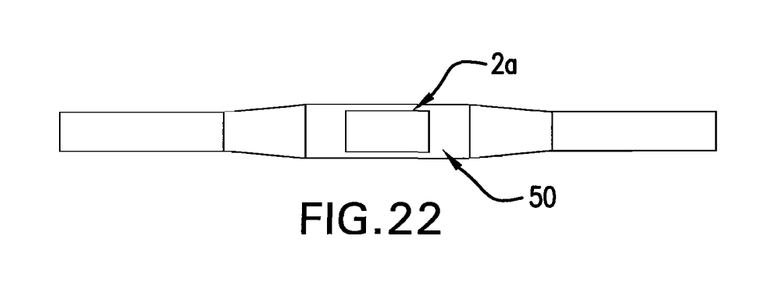
FIG. 22 is a plan view of the pipe showing a flattened portion of the pipe with a magnet over the flattened portion of pipe.
Figure 23:
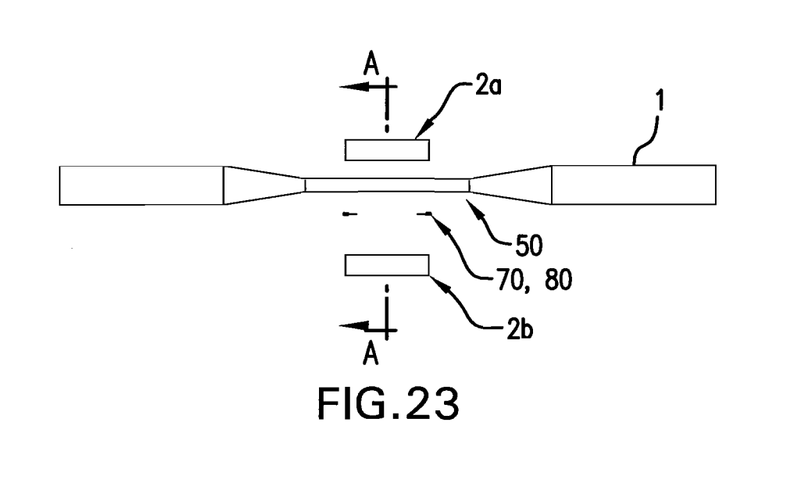
FIG. 23 is a front view of the pipe with the flattened section and magnets set above and below the flattened section and with Hall-effect sensors between the lower magnet and the flattened section of pipe and the optional upper magnet.
Figure 24:
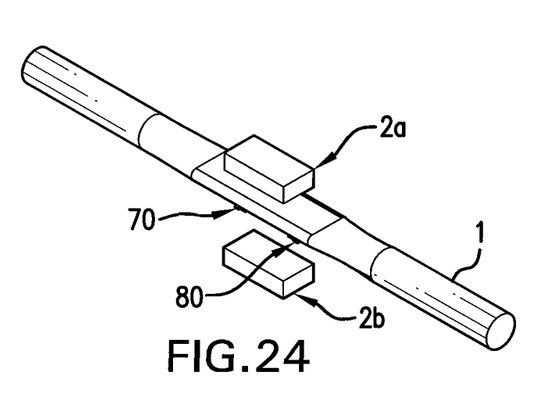
FIG. 24 is a perspective view of the pipe, the magnets, and Hall-Effect Sensor.
Figure 25:
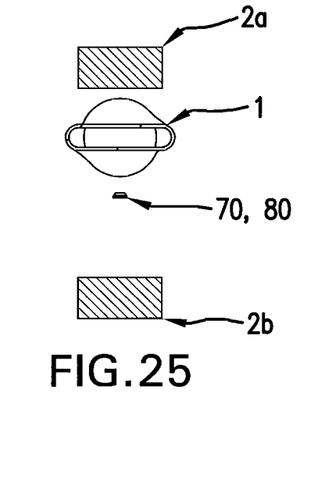
FIG. 25 is a sectional view showing the pipe, the flattened section of pipe, the magnets above and below the pipe and the Hall-Effect Sensor mounted between the lower magnet and the flattened section of pipe.
Figure 26:
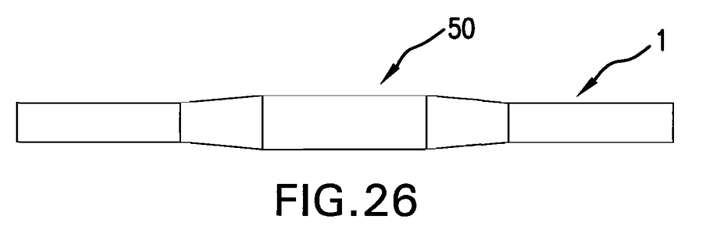
FIG. 26 is a plan view of the pipe and the flattened section of the pipe.
Figure 27:
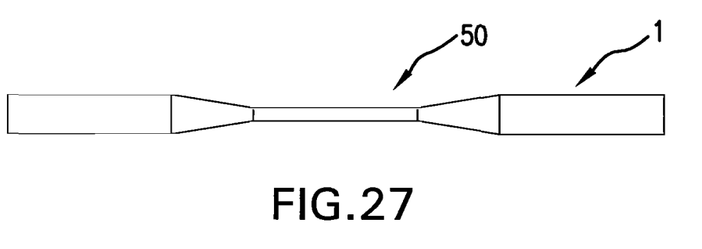
FIG. 27 is a front view of the pipe and the flattened section of the pipe.
Figure 27A:
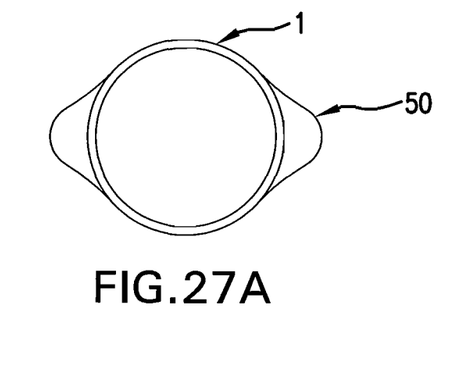
FIG. 27a is an end view of the pipe in FIG. 27 that shows the flaring out the flattened section 50.
Figure 28:
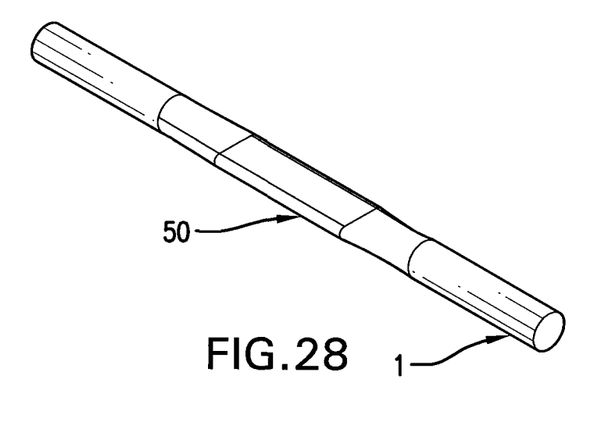
FIG. 28 is a perspective drawing of the pipe with the flattened section of the pipe.
Figure 29:
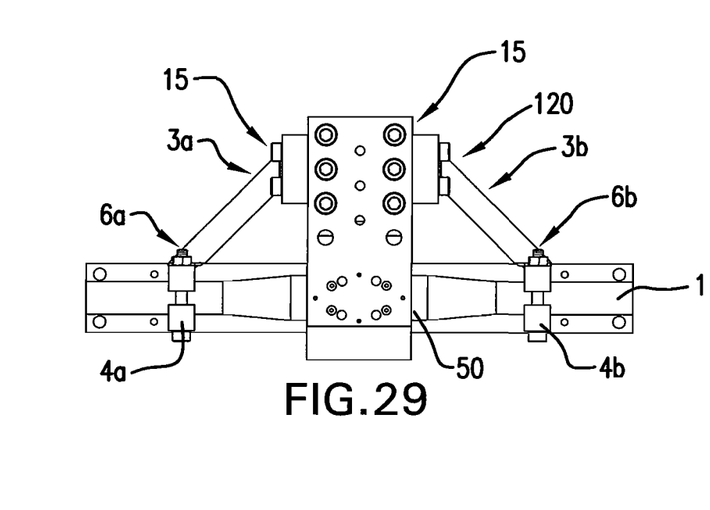
FIG. 29 is a plan view of the mounting frame (housing) for non-contact magnetic flow meter.
Figure 30:
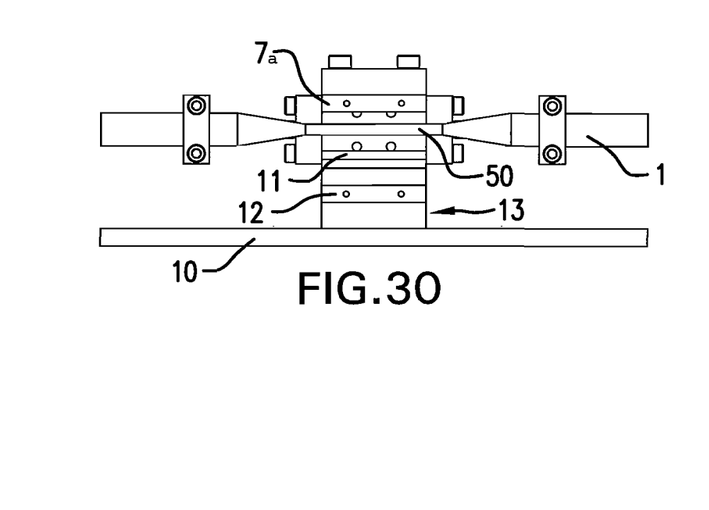
FIG. 30 is a front view of the mounting frame (housing) for non-contact magnetic flow meter.
Figure 31:
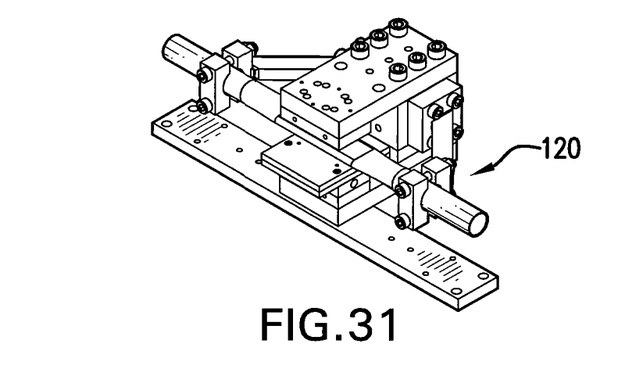
FIG. 31 is a perspective drawing of the mounting frame (housing) for non-contact magnetic flow meter.
Figure 32:
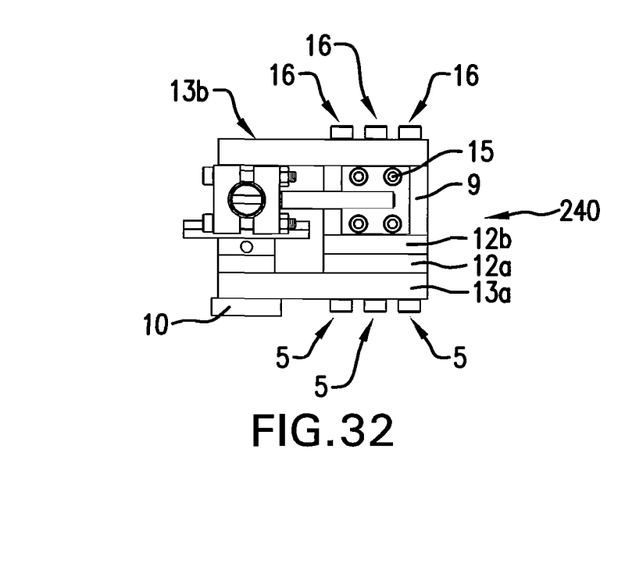
FIG. 32 is a right side view of mounting frame (housing) for non-contact magnetic flow meter.

FIGS. 11, 12, and 12A are exploded schematics of the electromagnet flow meter showing precisely how the preferred embodiment is assembled. FIGS. 29 through 32 illustrate unexploded views of the preferred embodiment of the mounting frame 120 and the mounting frame support structure 240 of the electromagnetic flow meter. To a mounting base 10 is bolted a first magnet mounting base 13a bolts 5. A first magnet 2b is placed on the first magnet mounting base 13a. A first magnet cover 7b is secured over the first magnet 2b using bolts 8. An adjustment spacer 34 is secured to the first magnet cover 7b. A lower sensor cover is secured to the adjustment spacer 34. A sensor circuit board assembly 18 is fitted with a first Hall-Effect sensor 70, a second Hall-Effect sensor 80 and a voltage regulator 90. The sensor circuit board assembly resides in a sensor lower cover 11 covered with a sensor upper cover 14. The sensor lower cover 11 and sensor upper cover 14 are held together and bolted to adjustment spacer 34 with fasteners 40 such that control cables for the Hall-Effect sensors and the voltage regulator can run through a channel provided in sensor lower cover 11. A crossover 9 is attached to the sensor lower cover 11. Right and left pipe support weldments 3a, 3b are bolted to crossover 9. A pipe or conduit 1 is held fast in the right and left pipe support weldments 3a, 3b with right and left lower pipe clamps 4a, 4b using bolts 6. The pipe 1 has a flattened second 50. The pipe 1 is seated in the right and left pipe support weldments 3a, 3b with right and left lower pipe clamps 4a, 4b such that the flattened section 50 of pipe 1 is oriented over and parallel to first magnet 2b. A second magnet cover 7a is fitted with a second magnet 2a and is bolted with fasteners 8 to a second magnet mounting base 13b. The second magnet mounting base 13b is fastened to crossover 9 using bolts 16. Correctly assembled, the first and second magnets 2a and 2b are installed with the same polarity (either north or south) such that both magnets are seated with north pole up or north pole down and Hall-Effect Sensors 70, 80 are seated in line with axis of pipe 1 with Hall-Effect sensor 70 over the forward edge of first magnet 2b and Hall-Effect sensor 80 over the rear edge of first magnet 2b, both sensors under the flattened section 50 of pipe 1.

FIGS. 13 through 16 provide additional views of the pipe 1 with the flattened area 50.

FIGS. 17 through 20 provide close up views of circuit board assembly 18 with Hall-Effect sensors 70 and 80. Also shown is voltage regulator 90 which is fastened to circuit board assembly 18 using a screw 96 and a nut 95.

FIGS. 21 through 27a show views of pipe 1 that illustrate the configuration in the preferred embodiment of a first magnet 2b, a circuit board assembly 18, Hall-Effect sensors 70 and 80 proximate to the flattened section 50 of pipe 1, and a second magnet 2a above the flattened section 50 of pipe 1.

The embodiment described in this disclosure is illustrative only. Many deviations may be made from the specific embodiment disclosed in this specification without departing from the invention. Accordingly, the scope of the invention is to be determined by the claims below rather than being limited to the specifically described embodiment.

The invention claimed is:

1. A flow meter comprising:
   a magnet,
   a substantially non-magnetic conduit adapted to convey conductive fluid flowing in said conduit, said conduit arranged proximate to said magnet, and
   a sensor for sensing distortion of magnetic lines of force created by said magnet when said fluid flows in said conduit,
   wherein said magnet is outside said conduit.

2. A flow meter according to claim 1, wherein said conduit is not in physical contact with said magnet.

3. A flow meter according to either claim 1 or claim 2, wherein said magnet is a rare earth magnet.

4. A flow meter according to either claim 3, wherein said rare earth magnet is chosen from any of the following types of rare earth magnets: Neodymium Iron Boron ($Nd_2Fe_{14}B$) magnet, Samarium-Cobalt ($SmCo_5$) magnet, or Samarium-Cobalt ($SmCo_{17}$) magnet.

5. A flow meter according to claim 3, said flow meter further comprising:
   a package of micro porous insulation,
   wherein said rare earth magnet is packed into said package of micro porous insulation to keep said rare earth magnet from heating up to its Curie point.

6. A flow meter according to either claim 1 or claim 2, wherein said conduit is a pipe selected from any of the following materials: 300 series stainless steel, ceramic, or Tantalum.

7. A flow meter according to claim 6, wherein:
   said pipe has a flattened area proximate to which said magnet and said sensor are fixed such that said sensor may detect said magnet and magnetic lines of force emitted by said magnet.

8. A flow meter according to either claim 1 or claim 2, wherein said sensor is a Linear Hall-Effect sensor.

9. A flow meter according to claim 8, wherein:
   said Hall-Effect sensor is fixed between said conduit and said magnet,
   said magnet possesses a forward edge and a rearward edge when fixed with fixing means in proximity to said conduit,
   said Hall-Effect sensor is fixed with second holding means such that such said Hall-Effect sensor is sandwiched between the forward edge of said magnet and said conduit or between said rearward edge of said magnet and said conduit.

10. A flow meter according to claim 8, wherein:
    said Linear Hall-Effect sensor is wired to a voltage regulator with control means so as to provide a constant 5 volts to said Linear Hall-Effect sensor.

11. A flow meter according to claim 8, said flow meter further comprising:
    a heat sink,
    wherein said Linear Hall-Effect sensor is attached with an attachment means to said heat sink.

12. A flow meter according to claim 8, said flow meter further comprising:
    a package of micro porous insulation,
    wherein said Linear Hall-Effect sensor is packed inside said package of micro porous insulation.

13. A flow meter according to claim 8, said flow meter further comprising:
    a cooling fan
    wherein said Linear Hall-Effect sensor is attached with an attachment means to said cooling fan.

14. A flow meter according to either claim 1 or claim 2, wherein:
    Said magnet is a first magnet fixed with first attachment means in proximity to said conduit, said first magnet having a north pole either oriented toward or away from said conduit, Said flow meter further comprises a second magnet fixed with a second attachment means in proximity to said conduit on the opposite said of said conduit from said first magnet, said second magnet having its north pole oriented in the same direction as said first magnet.

15. A flow meter according to claim 14, wherein said flow meter further comprises:
    a circuit board
    two linear Hall-Effect sensors attached to said circuit board
    a voltage regulator attached to said circuit board with control means and wired to provide 5 volts to said linear Hall-Effect sensors
    said circuit board held with holding means proximate to said conduit between said first magnet and said conduit.

16. A flow meter according to either claim 1 or claim 2, wherein said sensor is a first Linear Hall-Effect sensor, and the flow meter further comprises a second Linear Hall-Effect sensor.

17. A flow meter according to claim 16, wherein:
    said first and second Linear Hall-Effect sensor are mounted on a circuit board.

18. A flow meter according to claim 17, wherein:
    said first and second Linear Hall-Effect sensors are mounted on opposite ends of said circuit board.

19. A method for measuring distortion of magnetic lines of force resulting from a conductive fluid flowing in a conduit, said method comprising:
    arranging a magnet emitting a magnetic field adjacent to said conduit proximate to but not in contact with said conductive fluid;
    providing a sensor for sensing distortion of lines of force created by said magnet when said fluid flows in said conduit, and
    causing said sensor to sense such distortion of lines of force.

20. A flow meter having a substantially non-magnetic conduit adapted to convey a conductive fluid flowing in said conduit having a voltage induced in it when said fluid is flowing in said conduit, a magnet to emit magnetic lines of force substantially perpendicular to the flow of said fluid, and a sensor adapted to sense distortions in said lines of force caused by said current, the improvement comprising sandwiching said sensor between said fluid and said magnet, said magnet in a position relative to said sensor such that said sensor can sense said distortions in said lines of force, said sensor and said magnet at positions proximate to but neither said sensor nor said magnet necessarily in physical contact with said fluid.

* * * * *